(12) United States Patent
Monks et al.

(10) Patent No.: US 8,332,545 B1
(45) Date of Patent: Dec. 11, 2012

(54) USB SWITCH WHICH ALLOWS PRIMARY USB CONNECTION IN RESPONSE TO USB SIGNALING

(75) Inventors: Morgan H. Monks, Tempe, AZ (US); David E. Haglan, Tempe, AZ (US)

(73) Assignee: SMSC Holdings S.a.r.l., Luxembourg (LU)

( * ) Notice: Subject to any disclaimer, the term of this patent is extended or adjusted under 35 U.S.C. 154(b) by 0 days.

(21) Appl. No.: 13/149,184

(22) Filed: May 31, 2011

(51) Int. Cl.
G06F 15/177 (2006.01)
G06F 3/00 (2006.01)
G06F 1/26 (2006.01)

(52) U.S. Cl. ............ 710/8; 710/14; 710/15; 713/1; 713/300

(58) Field of Classification Search .................... None
See application file for complete search history.

(56) References Cited

U.S. PATENT DOCUMENTS

| | | | |
|---|---|---|---|
| 5,848,298 A | 12/1998 | Steere, Jr. et al. |
| 5,884,086 A | 3/1999 | Amoni et al. |
| 6,184,652 B1 | 2/2001 | Yang |
| 6,253,329 B1 | 6/2001 | Kang |
| 6,308,239 B1 | 10/2001 | Osakada et al. |
| 6,507,172 B2 | 1/2003 | Sherman |
| 6,531,845 B2 | 3/2003 | Kerai et al. |
| 6,532,512 B1 | 3/2003 | Torii et al. |
| 6,541,879 B1 | 4/2003 | Wright |
| 6,622,195 B2 | 9/2003 | Osakada et al. |
| 6,665,801 B1 | 12/2003 | Weiss |
| 6,732,218 B2 | 5/2004 | Overtoom et al. |
| 6,798,173 B2 | 9/2004 | Hsu |
| 6,946,817 B2 | 9/2005 | Fischer et al. |
| 7,017,055 B1 | 3/2006 | Ho |
| 7,069,347 B1 | 6/2006 | Kolokowsky |
| 7,170,259 B2 | 1/2007 | Veselic |
| 7,271,568 B2 | 9/2007 | Purdy et al. |
| 7,310,697 B2 | 12/2007 | Pandit et al. |
| 7,340,627 B1 | 3/2008 | Harvey |
| 7,373,528 B2 | 5/2008 | Schindler |
| 7,421,594 B2 | 9/2008 | Nakajima et al. |
| 7,523,338 B2 | 4/2009 | Fu et al. |

(Continued)

FOREIGN PATENT DOCUMENTS

EP 0 982 663 3/2000

(Continued)

OTHER PUBLICATIONS

Compaq et al., "Universal Serial Bus Specification Revision 2.0," Apr. 27, 2000, pp. 171-177.

(Continued)

*Primary Examiner* — Tanh Nguyen
(74) *Attorney, Agent, or Firm* — Meyertons Hood Kivlin Kowert & Goetzel, P.C.; Jeffrey C. Hood; Joel L. Stevens

(57) ABSTRACT

System and method controlling connectivity within a device. A device may be coupled to a host device. In response to the coupling, low power logic (e.g., an embedded device) of the device may be coupled to the host device. The low power logic may perform enumeration with the host device using only power provided by the host device. The low power logic may also charge a battery of the device using power provided by the host device. Device circuitry of the device may provide a signal for coupling to the host device. In response, the device circuitry may be coupled to the host device and may perform device enumeration with the host device.

13 Claims, 5 Drawing Sheets

U.S. PATENT DOCUMENTS

| | | |
|---|---|---|
| 7,624,202 B2 | 11/2009 | Monks et al. |
| 7,631,111 B2 | 12/2009 | Monks et al. |
| 2004/0221180 A1 | 11/2004 | Enami et al. |
| 2004/0239294 A1 | 12/2004 | Veselic et al. |
| 2004/0251878 A1 | 12/2004 | Veselic |
| 2005/0144495 A1 | 6/2005 | Nakajima et al. |
| 2005/0174094 A1 | 8/2005 | Purdy et al. |
| 2006/0095641 A1 | 5/2006 | Pandit et al. |
| 2006/0112288 A1 | 5/2006 | Schindler |
| 2006/0181241 A1 | 8/2006 | Veselic |
| 2006/0287007 A1 | 12/2006 | Veselic et al. |
| 2007/0022311 A1 | 1/2007 | Park |
| 2007/0088967 A1 | 4/2007 | Fu et al. |
| 2007/0143505 A1 | 6/2007 | Terrell, II |
| 2007/0220287 A1 | 9/2007 | Sang-Heon |
| 2008/0183909 A1* | 7/2008 | Lim et al. .................. 710/14 |
| 2010/0188237 A1 | 7/2010 | Monks et al. |

FOREIGN PATENT DOCUMENTS

| | | |
|---|---|---|
| GB | 2352540 | 1/2001 |
| JP | 2000-242377 | 9/2000 |
| JP | 2001-043178 | 2/2001 |
| KR | 10-2004-0008365 | 1/2004 |
| KR | 10-0490068 | 5/2005 |

OTHER PUBLICATIONS

USB MulitSwitch Hub: Datasheet, USB2524: Revision 1.2, SMSC: Success by Design, Jul. 17, 2006, 57 pages.

LM3658 Dual Source USB/AC Li Chemistry Charger IC for Portable Applications, National Semiconductor Corporation, May 2005; 14 pages.

Terry Remple, Megan Hayes, and Dave Wilson, "CEA-936-A USB Carkit Specification," Consumer Electronics Association (CEA) R6 Mobile Electronics Committee, Aug. 11, 2005, 97 pages.

Carlson, Brian, "SmartReflex Power and Performance Management Technologies—reduced power consumption, optimized performance", Texas Instruments: Technology for Innovators, 2005, 8 pages.

Wireless Handsets: TWL4030, Texas Instruments, http://focus.ti.com/general/docs/wtbu/wtbugencontent.tsp?templateId=6123&contentId=4634&DCMP=WTBU&HQS=ProductBulletin+OT+twl4030, 2005, 2 pages. (Retrieved May 21, 2007).

Programmable Multi-Host Device Sharing USB Hub, IBM Research Disclosure, Feb. 1999, 1 page.

\* cited by examiner

USB SWITCH WHICH ALLOWS PRIMARY USB CONNECTION IN RESPONSE TO USB SIGNALING

FIELD OF THE INVENTION

The present invention relates to the field of Universal Serial Bus (USB) devices, and more particularly to a USB switch which allows a primary USB connection in response to USB signaling.

DESCRIPTION OF THE RELATED ART

In recent years, there has been a proliferation of portable USB devices that utilize power provided by a battery. For example, many people own or purchase various portable devices such as cell phones, music players, video players, and laptops, among other devices.

In using such portable devices, users often require that they be easily recharged, e.g., using various electrical outlets, e.g., in a house or car. Most users that own or purchase these devices also own host device(s), e.g., a computer, which supports USB communication/devices. In such cases, it is often convenient to charge the portable devices using power supplied by the host device, e.g., using the USB connection.

However, when the battery of the portable device is depleted, e.g., when the battery is "dead", or when the device is not turned on or booted up, the portable device is often unable to enumerate with the USB host in order to charge. Enumeration refers to the process of a host device establishing communication with the device, e.g., the USB device. More specifically, if the portable devices do not have enough power to engage in enumeration, the portable devices may not be allowed to charge at enumerated power. "Charging at enumerated power" oftentimes is desirable because current standards, e.g., the USB specification, do not allow the device to draw very much current until the device is enumerated. Under the current specification, the portable devices may not use more than 100 milliamps (mA) to charge the battery until after enumeration, where it may draw 500 mA.

Some current systems overcome this problem by supplying power to the USB device in excess of those power levels described in the USB specification. However, these systems do not comply with the specification and may be subject to having their power source removed, e.g., by the host device. Thus, improvements in enumeration and USB battery charging would be desirable.

SUMMARY OF THE INVENTION

Various embodiments of a system and method for enumerating a USB device using low power are presented herein.

The following describes a method for enumerating a USB device using power provided by a host device before enumeration. As used herein, the term "low power" is used to refer to power provided by a host device before enumeration. Additionally, "low power enumeration" refers to enumeration that is capable of being performed using only the power provided by the host device. The USB device may be a portable device (such as a cell phone, tablet computer, netbook, laptop, etc.) and/or include a battery, as well as battery charging circuitry.

Coupling of the USB device to a host USB device (such as a computer system) may be detected. For example, a user may physically attach the USB device to the host USB device and this attachment or coupling may be detected. For example, a USB cable may be connected to a USB port of the USB device on one side, and may be coupled to the host USB device in some manner on the other side. The USB device may be coupled to the host USB device via various mechanisms, e.g., directly, using a cable, via a USB hub (e.g., a display device including a USB hub) that is in turn coupled to the host USB device, wirelessly (e.g., over wireless USB, Bluetooth, WLAN, etc.), among other configurations.

The detection of the coupling of the USB device to the host USB device may be performed via any of numerous appropriate methods. For example, in one embodiment, when the USB device and the host USB device are coupled, a change in the electrical characteristics of the wires connecting the two systems may be detected by one or both of the systems. For example, upon coupling, the resistance in the lines may change, which may be detected by the USB device and/or the host USB device. More specifically, in one embodiment, the USB device may detect coupling to the host USB device by detecting provision of power by the host USB device, e.g., on a VBUS line in the USB connection.

Upon being connected to the host USB device, low power logic of the USB device may be coupled to the host USB device. For example, the USB device may include a switch that is configured to initially connect the low power logic to the USB port of the USB device. The switch may be controlled by switch logic that controls a position of the switch; for example, the switch logic may implement a state machine for determining and controlling the position of the switch.

The low power logic may be configured to perform enumeration with the host USB device. For example, the low power logic may be an embedded device that is able to perform enumeration with the host USB device using only power provided by the host USB device. In one embodiment, the embedded device may perform enumeration as a human interface device (HID), although other types of enumerations are envisioned. Once enumerated, the low power logic may be configured to draw additional power from the host USB device (e.g., 100 mA before enumeration and up to 500 mA after enumeration) and may use the power provided by the host USB device to charge a battery of the USB device.

Later, a signal may be received from device logic of the USB device to couple the device logic to the host USB device. For example, the device logic may not have been available initially, when the low power logic was coupled to the host USB device. More specifically, the battery level of the battery of the USB device may not have been sufficient to power the device logic of the USB device (e.g., the device logic may not be able to power itself using only the power provided by the host USB device). Accordingly, the low power logic may charge the battery until it is sufficient to power the device logic. As another example, the device logic may not have been booted up or powered on when the low power logic was coupled to the host USB device. In this example, the low power logic may be used (e.g., to charge the battery) while the device logic is booted up. After being powered, the device logic may send a signal (e.g., to the switch logic) requesting that the device logic be coupled to the host USB device for enumeration. The signal may be provided to the switch (or switch logic) over the same connection that is used to couple to the host USB device. For example, rather than using a separate I/O (e.g., GPIO) connection, the device logic may simply use the USB connection (e.g., including a DP and DM signal line) connecting the device logic and the switch to provide the signal. In one embodiment, the signal may be a 1.5K pullup on the DP signal line. The signal may be the same signal used to initiate connection or enumeration with the host USB device. Thus, where this same signal is used, no modification to the device logic may be required.

In response to the signal, the switch may change from coupling the low power logic to the host USB device to coupling the device logic to the host USB device. In some embodiments, this change may be performed by first decoupling the low power logic from the host USB device and waiting for a period of time. The period of time may be long enough for the host USB device to detect the disconnection from the low power logic. Once that time has elapsed, the device logic may be coupled to the host USB device, and enumeration of the device logic can begin.

Later, the USB device may be disconnected from the host USB device (e.g., physically disconnecting, such as by a user disconnecting the USB device from the cable that couples the USB device and host USB device). The USB device may detect the disconnection, e.g., by detecting a loss of power provided from the host USB device. In some embodiments, in response, the USB device may return to an initial position. For example, the USB device may change the switch position to connecting the low power logic to the USB port of the USB device, so that when a host USB device is coupled, the low power logic can begin enumeration with the host USB device.

BRIEF DESCRIPTION OF THE DRAWINGS

A better understanding of the present invention can be obtained when the following detailed description of the preferred embodiment is considered in conjunction with the following drawings, in which.

Figure 1A:
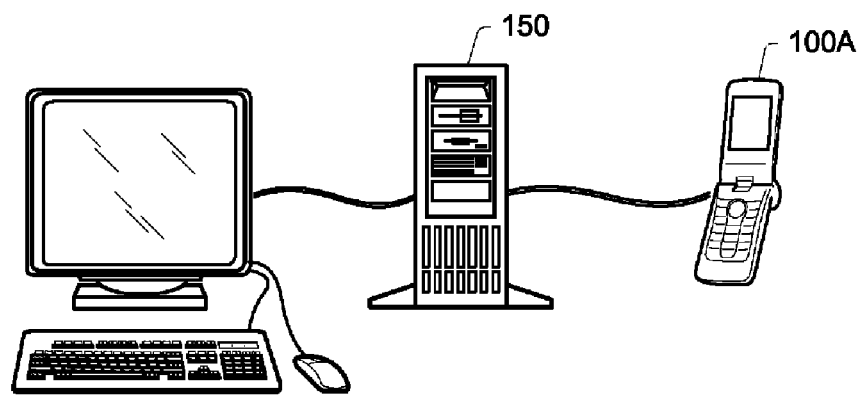
FIGS. 1A and 1B illustrate exemplary systems suitable for implementing various embodiments of the invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

U.S. Pat. No. 7,624,202 titled "System and Method for Enumerating a USB Device Using Low Power", whose inventors are Morgan H. Monks and Mark R. Bohm, and which issued on Nov. 24, 2009, is hereby incorporated by reference in its entirety as though fully and completely set forth herein.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network and/or other physical transmission medium, that conveys signals such as electrical, electromagnetic, or digital signals.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Portable Device—any of various types of portable computing devices, including cell or mobile phones (including smart phones), PDAs, digital cameras, portable media players, netbooks, etc. In general, the term "portable device" can be defined to encompass devices (or combinations thereof) which include at least one processor that executes instructions from a memory medium and is easily carried (e.g., handheld) by a user.

Figure 1B:
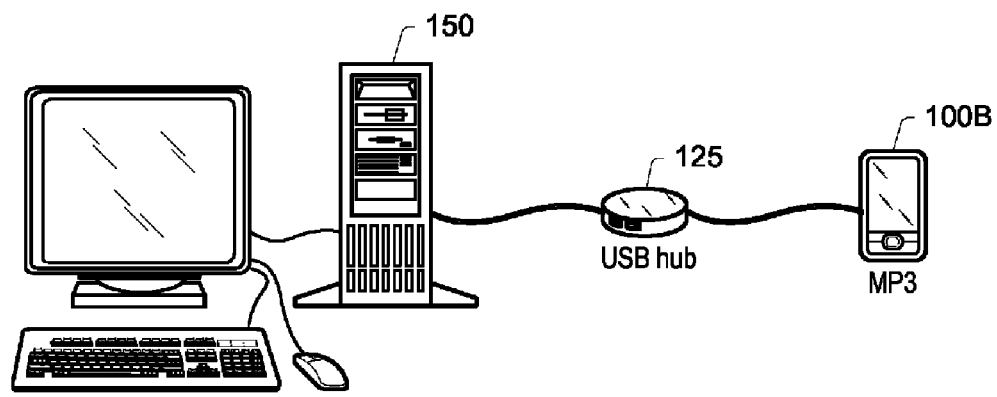

FIGS. 1A and 1B—Exemplary Systems

FIGS. 1A and 1B illustrate embodiments of an exemplary system operable to perform low power enumeration of a USB device 100, as described below. As shown in FIG. 1A, the USB device 100A (e.g., a cell phone, such as a smart phone) may be coupled to host device 150. In FIG. 1B, the USB device 100B (e.g., an MP3 player) may be coupled to the host device 150 via a USB hub 125.

The USB device 100 may be any of numerous devices (e.g., portable devices). For example, the USB device 100 may be a cell phone (e.g., cell phone 100A illustrated in FIG. 1A), a personal music player (e.g., player 100B illustrated in FIG. 1B, e.g., an mp3 player, and/or an IPOD™, among other players, a CD player, etc.), a personal video player (e.g., a digital video player, a DVD player, etc.), a peripheral device (e.g., a printer), an input device (e.g., a game controller, touchpad, mouse, and/or keyboard, among others), or any other device, e.g., that requires battery charging. Thus, the USB device 100 may be any of a variety of appropriate devices.

Additionally, the host device 150 may be any of various host devices. More specifically, the host device 150 may be a computer system, a USB hub, e.g., an external USB hub or one included in an electronic system (e.g., the computer system 150 or display device, among others), and/or other types of host devices, such as ones that provide power for charging the USB device 100. Alternatively, or additionally, the host device 140 may be a second USB device, e.g., similar to the USB device 100, among others. For example, in one embodiment, the second USB device may be a USB on-the-go (OTG) device which may be operable to act as a host and a device, e.g., depending on the situation. Thus, according to various embodiments the host device 150 may be any of various appropriate devices.

The host device 150 of FIGS. 1A and 1B may include/couple to a display device configured to display video signals received from the host device 150 and/or to act as a USB hub. In some embodiments, the display device may act as the USB hub 125 as well as displaying video signals from the host device 150. Thus, the hub 125 may be incorporated in the display device of the host device 150. Additionally, the host device 150 240 may include a keyboard and mouse which may be USB devices. The keyboard and mouse may couple to the host device 150 in a variety of ways, e.g., directly to the host device 150 or via the USB hub included in the display device, among other methods. Thus, in FIGS. 1A and 1B, the keyboard and mouse are shown coupled to the display, which may act as a USB hub. Alternatively, the keyboard and mouse may be coupled to the host device 150, e.g., a USB hub included in the host device 150.

Additionally, the host device 150 may include at least one memory medium on which one or more computer programs or software components may be stored. For example, the memory medium may store operating system software, as well as other software for operation of the host device 150. Various embodiments further include receiving or storing instructions and/or data implemented in accordance with the foregoing description upon a carrier medium. Similarly, the USB device 100 may include a memory medium in processor (e.g., included in a system on a chip (SOC) of the USB device 100).

In some embodiments, the USB hub 125 of FIG. 1B may be a passively powered device, e.g., where the USB hub 120 receives power provided by the host device 150 (e.g., the motherboard of the computer system 150), and/or an actively powered device, e.g., where the USB hub 125 receives power from a power source, e.g., a wall socket, a battery (such as, for example, of an automobile, e.g., from the lighter of the automobile), and/or other power supplies (e.g., a power supply of the host device 150). More specifically, in one embodiment, actively powered may mean that the USB hub 125 is powered from a power source which will not limit the consumption of power by the USB device, e.g., limit the consumption according to a standard, such as, for example the USB specification. In some embodiments, the USB hub 125 may include one or more ports for coupling to various devices, e.g., the USB device 100 and/or the host device 150. Thus, the USB hub 125 may be powered actively and/or passively and provide communications between a host device and a device, among other capabilities.

Note that the above descriptions of the host device 150 (and associated components), the USB device 100, and the USB hub 125 are exemplary only and other components and systems are envisioned. For example, while the various devices are shown as coupling via wires, the devices may be coupled wirelessly, e.g., via wireless USB, Bluetooth, WLAN, etc.

Figure 2A:
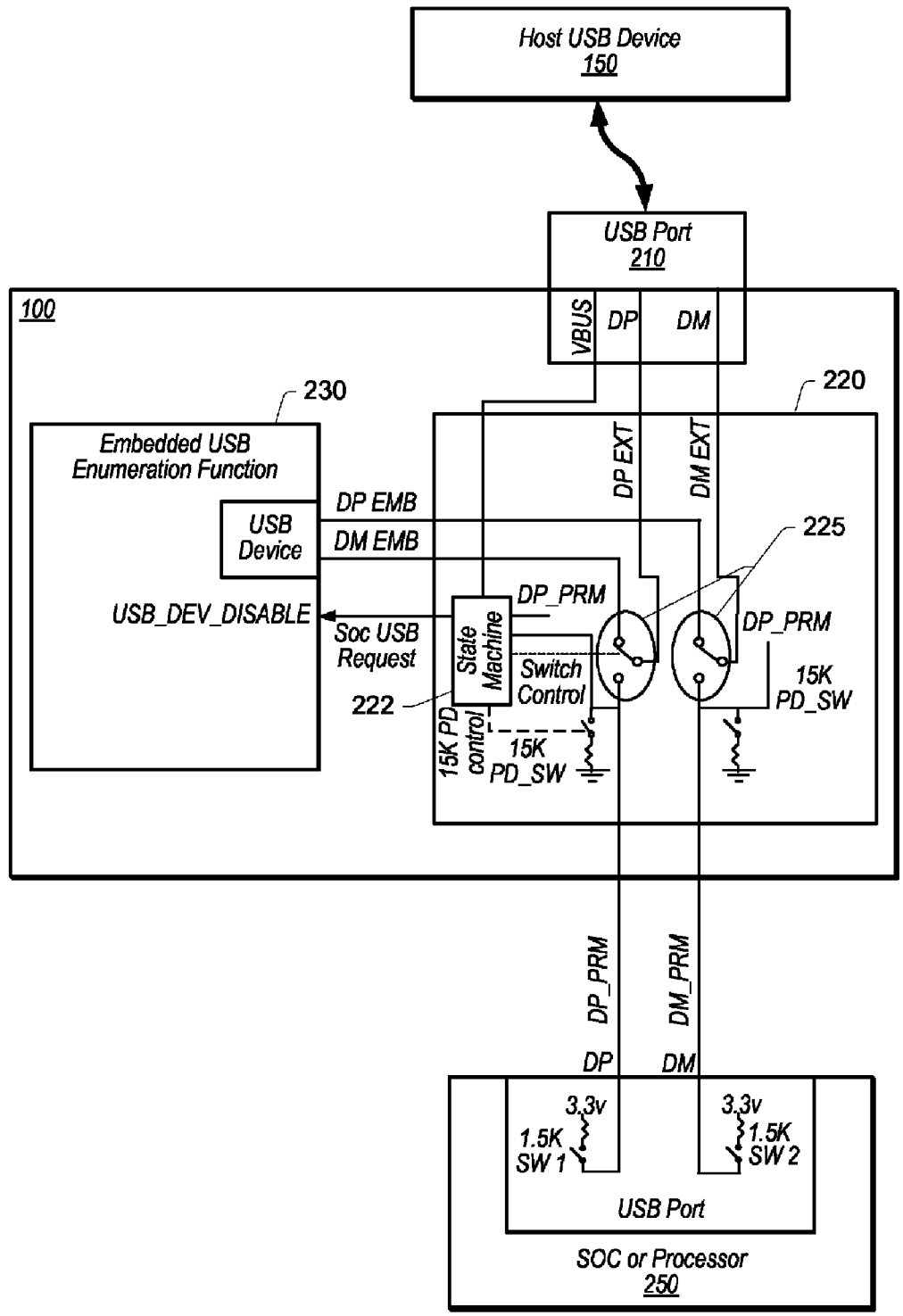
FIGS. 2A-2C are block diagrams illustrating one embodiment of a USB device.
Figure 2B:
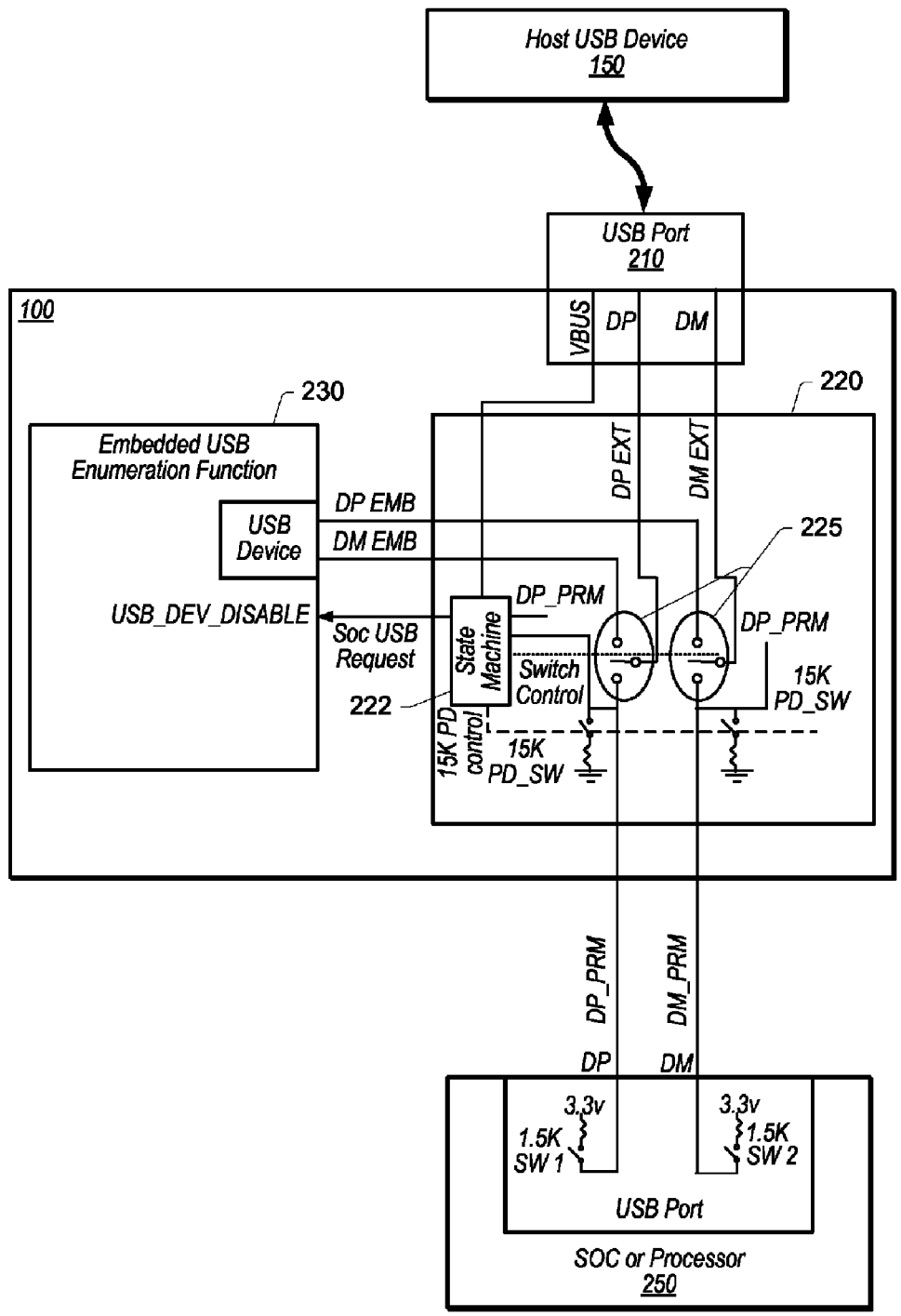
Figure 2C:
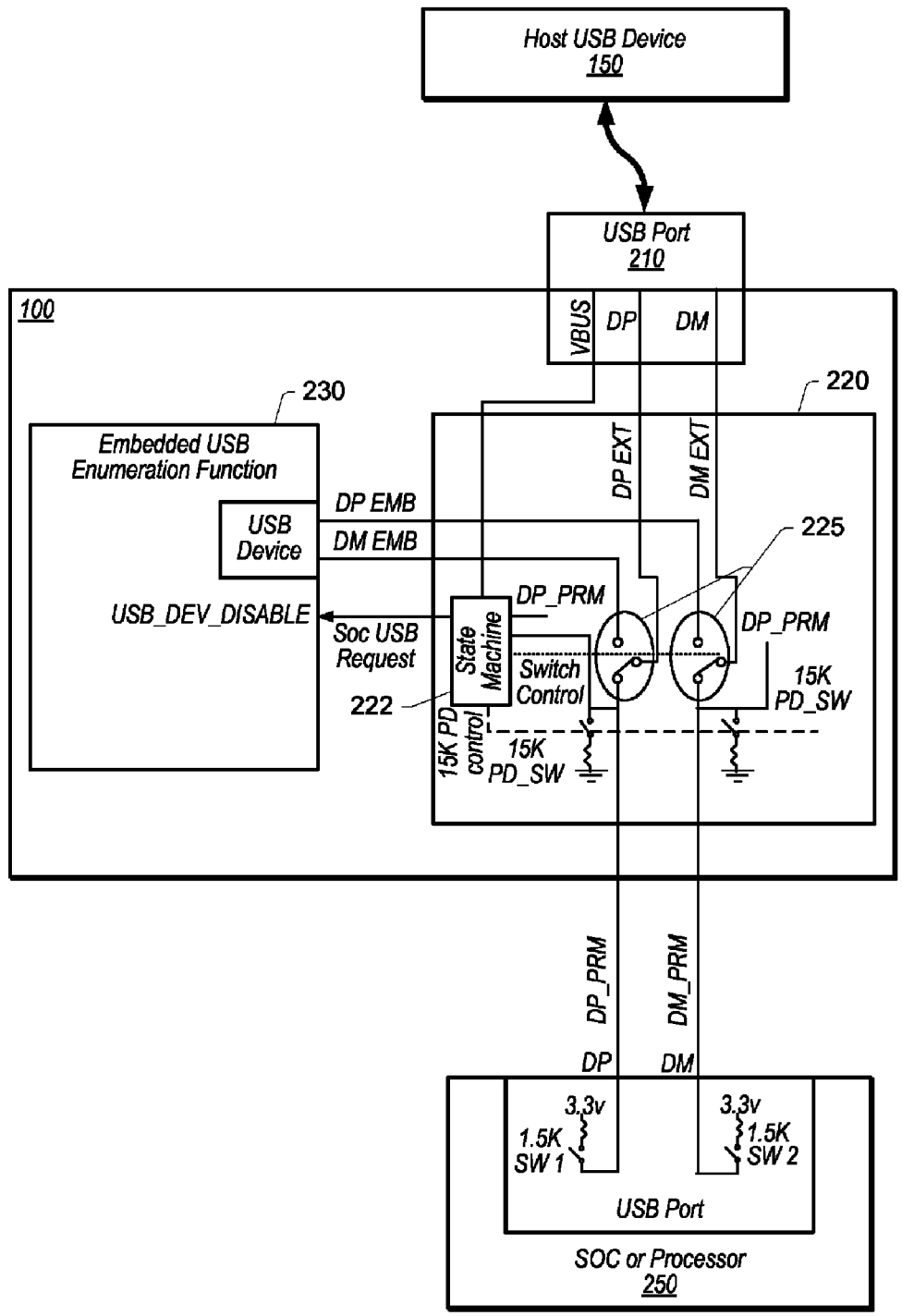

FIGS. 2A-2C—Exemplary Block Diagrams

FIGS. 2A-2C are exemplary block diagrams of the USB device 100 coupled to the host USB device 150. As shown in FIG. 2A, the USB device 100 includes a USB port 210 which is coupled to USB switch device 220. The USB switch device 220 includes switch 225 (implemented as two separate switches) which control connectivity between the USB port 210 (and therefore connectivity to the host USB device 150) and either the low power logic 230 (e.g., an embedded device) or the device logic 250 (e.g., the SOC or processor of the device). More specifically, the DP/DM signal lines from the USB port 210 are coupled to the switch 225, where two separate DP/DM signal lines may be connected, a DP/DM line for the low power logic 230 or a DP/DM line for the device logic 250. As discussed herein, these DP/DM lines may be referred to as "USB connections" when described in the context of within the USB device 100. Note that the USB switch device 220 may be implemented as its own chip. Accordingly, it may have three ports, one for the USB port 210, one for the low power circuitry (or other circuitry) 230, and one for the device circuitry 250. The DP/DM lines connecting the switch 225 to these ports may still be referred to as "USB connections". The position of the switch 225 may be controlled by the state machine 222 of the USB switch device 220.

In more detail, FIG. 2A illustrates an initial configuration of the USB switch device 220 after the USB device 100 is connected to the host USB device 150 via the USB port 210. The cable connected to the host USB device 150 enables the VBUS to be sensed by the state machine 222 in the USB switch device 220. In response, the USB switch device 220 may put the switch 225 on the USB DP/DM lines to connect the host USB device 150 to the low power logic 230. Simultaneously, the state machine 222 may close the 15K pulldown resistors on the switch terminal connected to the device circuitry 250. Note that while the preceding describes a change in position of the switch 225, the switch 225 may already be in the position of FIG. 2A. For example, this position may be an initial position which is returned to after a USB session. Accordingly, no change in position for switch 225 may be required initially.

In this configuration, the low power logic (e.g., the embedded USB device) 230 can be enumerated by the host USB device 150. For example, the low power logic may begin enumeration as a HID, even though it may not implement functionality as an HID. Other device identifications and enumerations are envisioned. After enumeration, the low power logic 230 may be configured to provide power provided by the host USB device 150 (which, after enumeration, may be up to 500 mA) to other circuitry, e.g., battery charging circuitry for charging a battery of the USB device 100. Alternatively, the low power logic 230 may include its own circuitry (e.g., battery charging circuitry) and may use the power for its own purposes.

Once the device logic 250 is ready to enumerate (e.g., for full speed or high speed), SW1 may be closed and the 1.5K pullup on DP may be asserted while the SW2 remains open. Accordingly, the USB switch device 220 may detect a logic high (3.3V logic) on DP. In response, the state machine 220 may open both of the 15K pull downs and change the switch 225 to the position of FIG. 2B. As used here, "device logic" is used to describe the logic of the device that implements the device's core functionality. For example, the device logic of a music player may be the logic that is configured to provide playback of music to the user, provide a user interface for providing the playback of the music, etc. Similarly, the device logic of a cellular phone may be the logic which enables a graphical interface on the phone, the ability to perform phone calls, etc. The device logic is distinct from the low power logic, which may not provide any core functionality of the device, but may be used to perform low power enumeration, e.g., in order to charge the battery when the device logic is unable to enumerate.

FIG. 2B shows that the switch 225 is in a position such that both the low power logic 230 and the device logic 250 are disconnected from the host USB device. This state may be necessary so that the USB host device 150 can detect that the previously enumerated USB device (the low power logic 230) has been disconnected. In one embodiment, this behavior may emulate a normal USB system where the cable has been physically disconnected. The state machine 222 may keep the switch 225 in the disconnect state of FIG. 2B for a sufficient time for the host USB device 150 to recognize that a disconnect has occurred.

After this time, the state machine 222 may change the switch to the position shown in FIG. 2C. In FIG. 2C, the device logic's DP or DM pullup may be present to the host USB device 150. In response, the host USB device may then begin a USB enumeration with assertion of USB reset. With this change the device logic 250 may begin a USB session as the host USB device 150 may see the device logic 250 1.5K pullup.

For device logic 250 that is low speed, the device logic SW2 will close with SW1 open. Accordingly, the USB switch device 220 may open both the 15 k PD switches and change the switch 225 to the configuration that connects the device logic 250 to the host USB device 150. Accordingly, a low-speed USB session may begin.

After the host USB device 150 is disconnected from the device 100, the state machine 222 may change the position of the switch 225 to the position of FIG. 2A. For example, in response to a detection of loss of power provided from the host USB device 150 (e.g., a loss of VBUS because the cable is disconnecting), the position of switch 225 may be returned to that of FIG. 2A.

Figure 3:
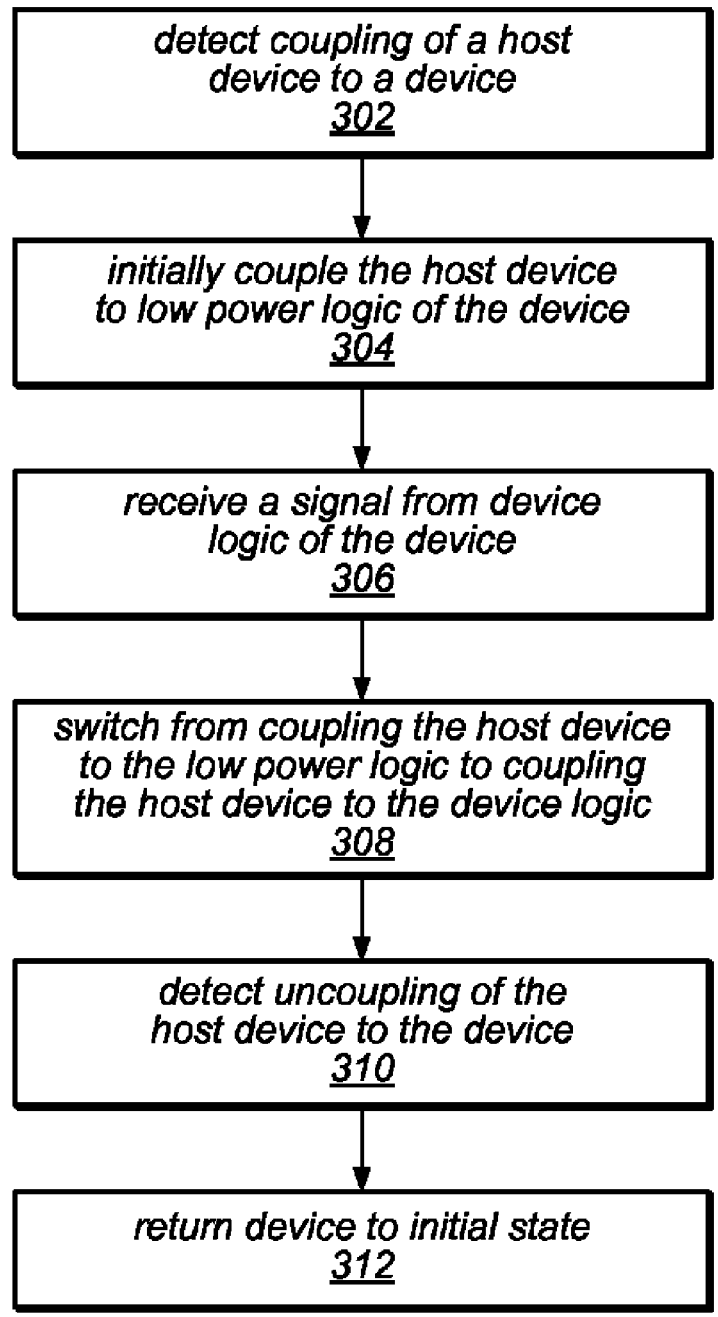
FIG. 3 is a flowchart diagram illustrating one embodiment of a method for controlling connections within the USB device.

FIG. 3—Method for Controlling USB Connectivity within a USB Device

FIG. 3 illustrates a method for controlling USB connectivity within a USB device. The method shown in FIG. 3 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

In 302, coupling of the USB device 100 to the host USB device 150 (such as a computer system) may be detected. For example, a user may physically attach the USB device 100 to the host USB device 150 and this attachment or coupling may be detected. For example, a USB cable may be connected to a USB port of the USB device 100 on one side, and may be coupled to the host USB device 150 in some manner on the other side. The USB device 100 may be coupled to the host USB device 150 via various mechanisms, e.g., directly, using a cable, via a USB hub 125 (e.g., a display device including a USB hub) that is in turn coupled to the host USB device 150, wirelessly (e.g., over wireless USB, Bluetooth, WLAN, etc.), among other configurations.

The detection of the coupling of the USB device 100 to the host USB device 150 may be performed via any of numerous appropriate methods. For example, in one embodiment, when the USB device 100 and the host USB device 150 are coupled, a change in the electrical characteristics of the wires connecting the two systems may be detected by one or both of the systems. For example, upon coupling, the resistance in the lines may change, which may be detected by the USB device 100 and/or the host USB device 150. More specifically, in one embodiment, the USB device 100 may detect coupling to the host USB device 150 by detecting provision of power by the host USB device 150, e.g., on a VBUS line in the USB connection.

Upon being connected to the host USB device 150, in 304, low power logic of the USB device 100 may be coupled to the host USB device 150. For example, as discussed above, the USB device 100 may include a switch that is configured to initially connect the low power logic to the USB port of the USB device 100. The switch may be controlled by switch logic that controls a position of the switch; for example, the switch logic may implement a state machine for determining and controlling the position of the switch.

The low power logic may be configured to perform enumeration with the host USB device 150. For example, the low power logic may be an embedded device that is able to perform enumeration with the host USB device using only power provided by the host USB device. In one embodiment, the embedded device may perform enumeration as a HID, although other types of enumerations are envisioned. Once enumerated, the low power logic may be configured to draw additional power from the host USB device 150 (e.g., 100 mA before enumeration and up to 500 mA after enumeration) and may use the power provided by the host USB device to charge a battery of the USB device, although other uses of the power are envisioned.

Later, in 306, a signal may be received from device logic of the USB device 100 to couple the device logic to the host USB device 150. For example, the device logic may not have been available initially, when the low power logic was coupled to the host USB device 150. More specifically, the battery level of the battery of the USB device 100 may not have been sufficient to power the device logic of the USB device 100. Accordingly, the low power logic may charge the battery until it is sufficient to power the device logic. As another example, the device logic may not have been booted up or powered on when the low power logic was coupled to the host USB device 150. In this example, the low power logic may be used (e.g., to charge the battery) while the device logic is booted up.

After being powered, the device logic may send a signal (e.g., to the switch logic) requesting that the device logic be coupled to the host USB device for enumeration. The signal may be provided to the switch (or switch logic) over the same connection that is used to couple to the host USB device 150. For example, rather than using a separate I/O (e.g., GPIO) connection, the device logic may simply use the USB connection (e.g., including a DP and DM signal line) connecting the device logic and the switch to provide the signal. In one embodiment, the signal may be a 1.5K pullup on the DP signal line. The signal may be the same signal used to initiate connection or enumeration with the host USB device. Thus, where this same signal is used, no modification to the device logic may be required in order to implement the switching behavior described herein.

In response to the signal, in 308, the switch may change from coupling the low power logic to the host USB device to coupling the device logic to the host USB device. In some embodiments, this change may be performed by first decoupling the low power logic from the host USB device and waiting for a period of time. The period of time may be long enough for the host USB device to detect the disconnection from the low power logic. Once that time has elapsed, the device logic may be coupled to the host USB device, and enumeration of the device logic can begin.

Later, in 310, the USB device may be disconnected from the host USB device (e.g., physically disconnecting, such as by a user disconnecting the USB device from the cable that couples the USB device and host USB device). The USB device may detect the disconnection, e.g., by detecting a loss of power provided from the host USB device. In some embodiments, in response, in 312, the USB device may return to an initial position. For example, the USB device may change the switch position to connecting the low power logic to the USB port of the USB device, so that when a host USB device is coupled, the low power logic can begin enumeration with the host USB device. However, 312 may not be performed in all embodiments.

Advantages

Embodiments of the systems and methods described above may not require the use of a dedicated GPIO from the processor (or SOC) or modifications to firmware of the device. Accordingly, modifications to GPIO or firmware in portable device is avoided as a cost in terms of new tooling for a GPIO or elimination of a previously allocated GPIO used for another function.

Generally, firmware modifications fall into two groups. Group one is firmware which resides in the boot ROM. This is generally critical due to the inability for changes and as well as for security of the IP embedded in the product, and in many cases, the wireless network which the portable device may be connected. The second case of firmware is what may be placed in non-volatile memory (e.g., Flash) or downloaded from the cloud. Modification of either group of firmware is expensive in terms of manpower, risk to the product, and delay in time to market.

The method described above may reduce the number of GPIO from the SOC/processor and connections to the USB charger by one pin on both functions. Additionally, the method may not require new software/firmware on the SOC/Processor for full USB compliance. Further, the method may accommodate the need for the processor to make the decision when to connect to the USB Host.

Thus, the method described herein may allow the embedded USB controller to continue the established USB session while the SOC is loading software. The booting of a portable device (e.g., a phone or tablet) may take many seconds and possibly a minute from the time VDD power is provided to the SOC/Processor until the software stack is fully functional. If the switch was changed when the VDD power was initially present on the SOC, a period of time would elapse that the SOC could not communicate with the external USB host. The embedded USB could be providing VBUS power at 500 mA for, e.g., a battery charger. With this solution, the battery charger is able to continue charging until the SOC is ready to take control of the USB connection. For example, the battery charger may be able to continue charging the battery at max power (e.g., 500 mA) until the SOC or processor asserts a DP pull up.

Further Embodiments

In further embodiments, instead of the low power logic described above, a second SOC/Processor port could be used. For example, this embodiment may provide a "standalone" USB switch where two USB devices (e.g., within a common housing) can utilize this invention for switching.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A USB device, comprising:
   a battery;
   at least one port, coupled to the battery, wherein the at least one port is operable to couple to a host USB device which is configured to charge the battery, where the at least one port is configured to receive an enumeration request from the host USB device;
   device logic, wherein the device logic is configured to perform functionality of the USB device, wherein the device logic is further configured to perform enumeration of the USB device with the host USB device;
   low power logic, wherein the low power logic is configured to perform enumeration of the low power logic with the host USB device using only power provided by the host USB device;
   a switch coupled to the at least one port, wherein the switch is configured to couple the device logic to the at least one port via a first USB connection or couple the low power logic to the at least one port via a second USB connection, wherein the switch is configured to:
      initially couple the low power logic to the at least one port via the second USB connection, wherein after coupling the low power logic to the at least one port, the low power logic is configured to perform enumeration of the low power logic with the host USB device, wherein after enumeration of the low power logic, the low power logic is configured to charge the battery using power provided by the host USB device;
      receive a signal from the device logic via the first USB connection while the low power logic is coupled to the at least one port via the second USB connection; and
      in response to the signal, switch from coupling the low power logic to the at least one port via the second USB connection to coupling the device logic to the at least one port via the first USB connection, wherein to switch from coupling the low power logic to the at least one port via the second USB connection to coupling the device logic to the at least one port via the first USB connection the switch is configured to:
         decouple the low power logic from the at least one port without coupling the device logic to the at least one port;
         wait for a first period of time, wherein the first period of time is long enough for the host USB device to recognize a disconnection of the low power logic; and
         after the first period of time, couple the device logic to the at least one port via the first USB connection;
      wherein after coupling the device logic to the at least one port, the device logic is configured to perform enumeration of the device logic with the host USB device.

2. The USB device of claim 1, wherein said initially coupling the low power logic to the at least one port via the second USB connection is performed in response to detecting power provided by the host USB device.

3. The USB device of claim 1, wherein, in response to a loss of connection between the USB device and the host USB device, the switch is configured to switch from coupling the device logic to the at least one port via the first USB connection to coupling the low power logic to the at least one port via the second USB connection.

4. The USB device of claim 1, wherein the switch is further configured to:

detect a loss of power provided by the host USB device; and switch from coupling the device logic to the at least one port via the first USB connection to coupling the low power logic to the at least one port via the second USB connection.

5. The USB device of claim 1, wherein the first USB connection comprises a DP and DM signal line between the switch and the device logic.

6. The USB device of claim 5, wherein said receiving the signal from the device logic comprises receiving a 1.5K pull-up on the DP signal line.

7. The USB device of claim 1, wherein the low power logic comprises an embedded device.

8. The USB device of claim 1, wherein the low power logic is configured to enumerate as a human interface device (HID).

9. The USB device of claim 1, wherein the switch comprises a state machine, wherein the state machine controls the switch position of the switch.

10. A method for controlling connectivity within a device, comprising:

detecting coupling of the device to a host USB device;

initially coupling low power logic of the device to the host USB device;

performing enumeration of the low power logic with the host USB device using only power provided by the host USB device;

receiving a signal from device logic via a USB connection within the device;

in response to the signal, switching from coupling the low power logic to the host USB device to coupling the device logic to the host USB device via the USB connection, wherein said switching comprises:

decoupling the low power logic from the host USB device without coupling the device logic to the host USB device;

waiting for a first period of time, wherein the first period of time is long enough for the host USB device to recognize a disconnection of the low power logic; and after the first period of time, coupling the device logic to the host USB device via the USB connection;

after coupling the device logic to the host USB device, performing enumeration of the device logic with the host USB device.

11. The method of claim 10, wherein after enumeration of the low power logic, the low power logic is configured to charge a battery of the device using power provided by the host USB device.

12. The method of claim 10, wherein the USB connection comprises a DP and DM signal line between the switch and the device logic.

13. The method of claim 12, wherein said receiving the signal from the device logic comprises receiving a 1.5K pull-up on the DP signal line.

* * * * *